June 6, 1961 R. C. SCHENCK ET AL 2,987,295

PLUG VALVES

Filed July 24, 1959 3 Sheets-Sheet 1

INVENTORS
ROBERT C. SCHENCK &
BY JACOB B. FREED

ATTORNEYS

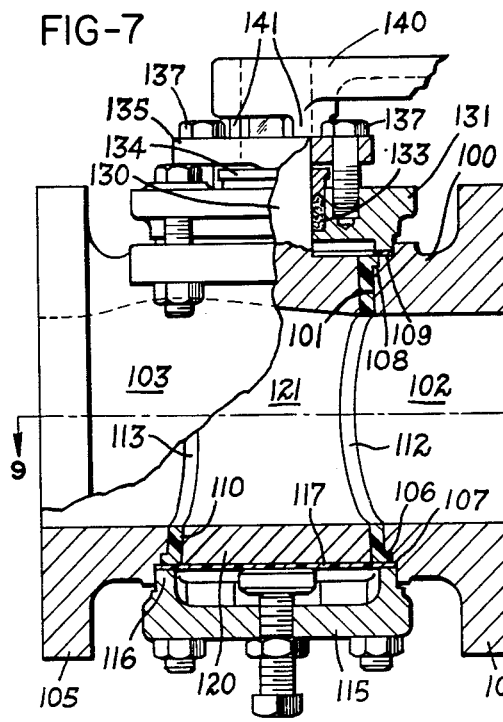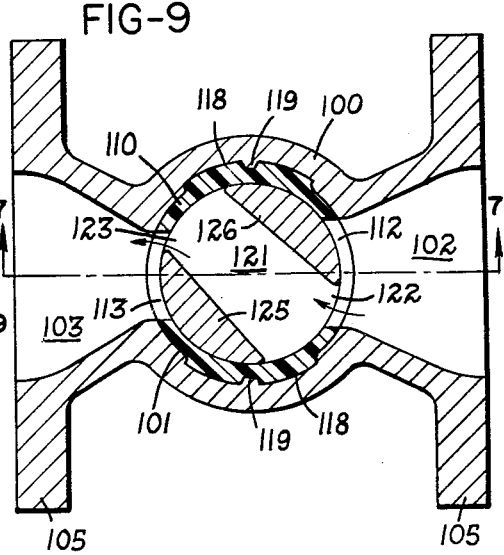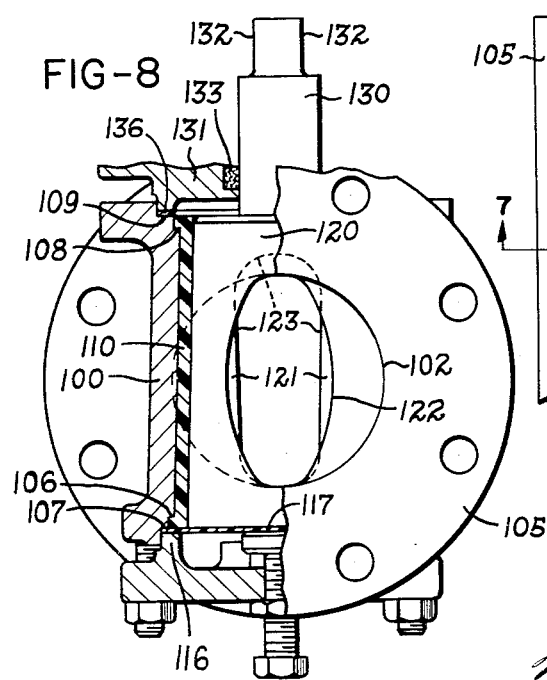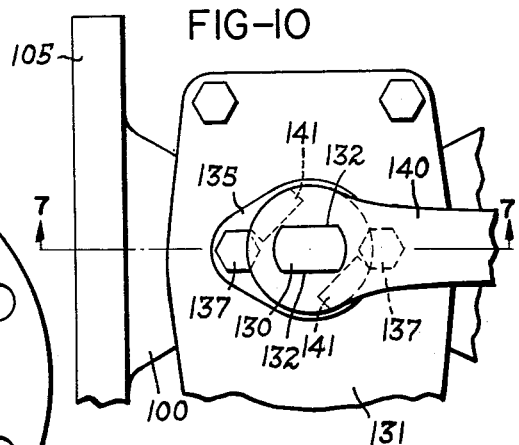

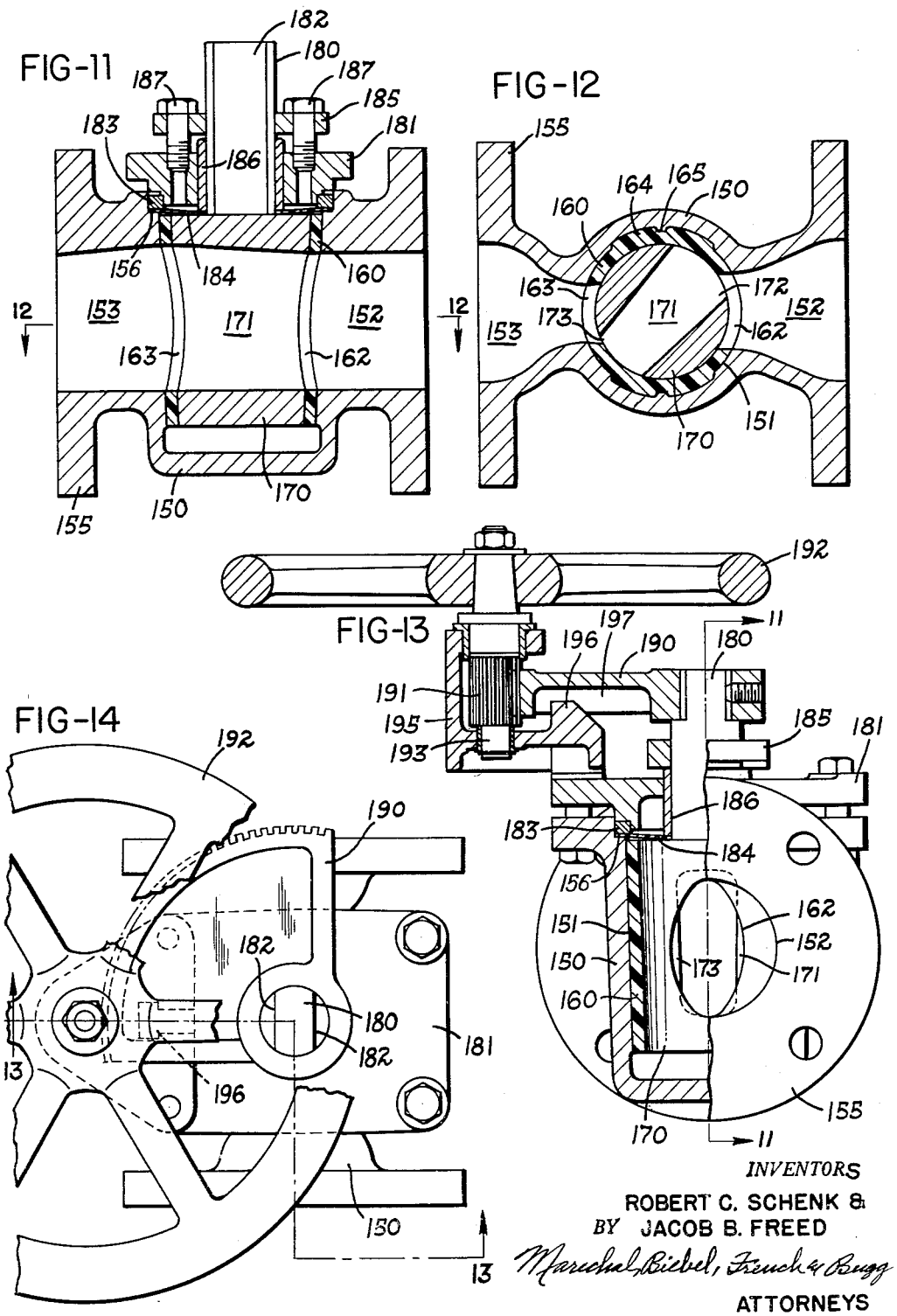

United States Patent Office 2,987,295
Patented June 6, 1961

2,987,295
PLUG VALVES
Robert C. Schenck and Jacob B. Freed, Dayton, Ohio, assignors to The Duriron Company, Inc., Dayton, Ohio, a corporation of New York
Filed July 24, 1959, Ser. No. 829,353
15 Claims. (Cl. 251—288)

This invention relates to plug valves of the type capable of use in handling corrosive fluids.

The invention is described in detail hereinafter in connection with plug valves employing sleeves or other separately formed and normally removable or renewable liner members constructed of a plastic material such particularly as one of the polytetrafluoroethylene materials sold under the trade name Teflon which have been found especially suitable for such use as pointed out, for example, in the patents of Robert C. Schenck, Nos. 2,713,987 and 2,729,420 and Jacob B. Freed No. 2,735,645, all issued to the assignee of this application. These Teflon materials have definite practical advantages for use in such valve liners from the standpoint of their inert nature, resilience and anti-frictional properties, and also they are readily deformable by cold flow under pressure into close pressure sealing engagement with the relatively movable valve parts.

The present invention is particularly concerned with the fact that under some conditions of use of plug valves of the above type, the liner material adjacent the inlet port of the body tends to be forced by line pressure into the plug port and thereafter to be torn or otherwise deformed as the plug is turned. This problem is not limited to liner members of Teflon material, but it is increasingly more severe in proportion to the size of the valve and the corresponding increase in the flow areas of the ports, and it is also encountered more frequently with valves of this type which are used to throttle the flow therethrough rather than in simple open or closed positions.

The invention has for its primary object the provision of a plug valve as outlined above which incorporates one or more liner members formed of a material such as Teflon capable of deformation as outlined above and which is of such novel structural and operational characteristics that the liner material is at all times supported against deformation into the plug port and protected against damage during the turning movements of the plug.

It is particularly an object of the invention to accomplish the above purpose by the provision of such a plug valve wherein the proportions and physical relationships of the plug, the valve body and the liner material are such that all throttling action by the plug on the flow through the valve body occurs between the downstream side of the plug port and the outlet port of the body while the interior of the plug port is maintained under the same pressure conditions as the inlet port of the valve body.

It is also an object of the invention to provide a plurality of different forms of such plug valves possessing the distinguishing characteristics of structure and mode of operation outlined above and which are variously adapted for different installations depending upon whether the entire valve is to be of new construction or an existing valve is to be modified to embody the invention.

Further objects and advantages of the invention will be apparent from the following description, the accompanying drawings and the appended claims.

In the drawings—

FIG. 7 is a view similar to FIG. 1 showing a valve in accordance with the invention wherein the ports in both the plug and liner sleeve are contoured to provide the characteristics and advantages of the invention, the view being taken on the line 7—7 of FIGS. 9 and 10 and showing the plug in fully open position;

FIG. 8 is a view partly in elevation looking from right to left in FIG. 7 and partly broken away to show the plug in elevation and in open position;

FIG. 9 is a section on the line 9—9 of FIG. 7 showing the plug in throttling position;

FIG. 10 is a fragmentary top view of the valve of FIGS. 7-9;

FIG. 11 is a view similar to FIG. 7, and taken in section on the line 11—11 of FIG. 13, showing the application of the invention to another type of plug valve;

FIG. 12 is a fragmentary section on the line 12—12 of FIG. 11, showing the plug in throttling position;

FIG. 13 is a view partly in elevation looking from right to left in FIG. 11 and partly in section on the line 13—13 of FIG. 14; and FIG. 14 is a fragmentary top view of the valve of FIGS. 11-13.

Figure 1:
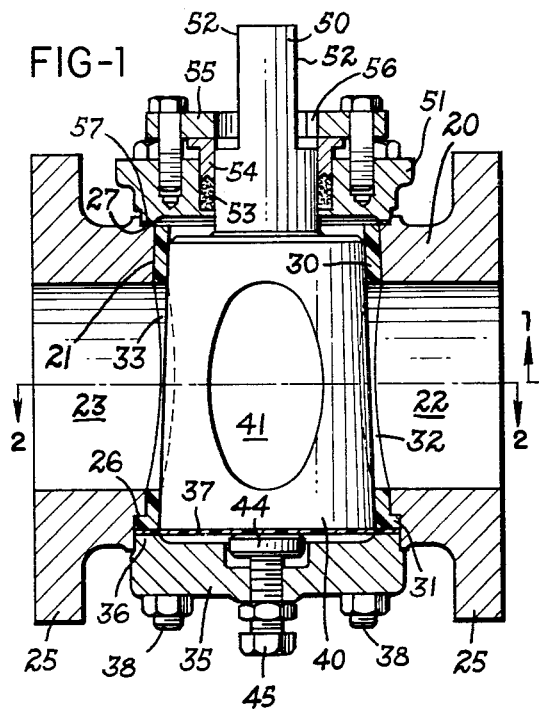
FIG. 1 is a sectional view through a conventional sleeve lined plug valve, the view being taken on the line 1—1 of FIG. 2 and showing the plug in fully closed position.
Figure 2:
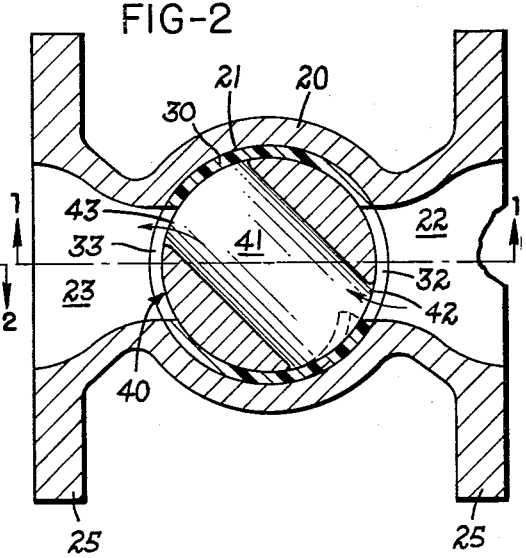
FIG. 2 is a section on the line 2—2 of FIG. 1 showing the plug turned to a partially closed throttling position wherein undesirable distortion of the liner sleeve may occur as indicated in dotted lines.

Referring to the drawings, which illustrate preferred embodiments of the invention, the conventional valve in FIGS. 1 and 2 includes a valve body 20 having a conical bore 21 extending transversely therethrough, and the inlet port 22 and the outlet port 23 intersect this bore from opposite sides of the valve body. Suitable flanges 25 are provided at the outer ends of the ports 22 and 23 for attachment to adjoining pipe members in the usual way. It will also be noted that each end of the bore 21 is shown as counterbored to provide a pair of shoulders 26 and 27.

Within the bore 21 is a liner sleeve 30 shown as of molded plastic material such as the Teflon material referred to above, and the larger end of this sleeve includes a circumferential shoulder 31 which seats on the shoulder 26 at the larger end of the bore 21. The sleeve 30 is provided with ports 32 and 33 matching the ports 22 and 23 in the body 20 and presenting edge portions which overlie the body ports. The liner sleeve 30 is secured in position by means of the cap 35 which includes a boss portion 36 received in clamping relation with the flange 31 through a sealing diaphragm 37 and is secured in position on the body 20 by a plurality of bolts 38 in the usual way.

The valve plug 40 is tapered to be received in rotatable sealing relation with the sleeve 30, and it includes a through port 41 having an inlet end 42 and an outlet end 43 adapted to register with the corresponding inlet and outlet ports in the body 20 and sleeve 30. Adjustable pressure is maintained on the larger end of the plug 40 through the diaphragm 37 by means of a thrust member 44 and pressure screw 45 threaded through the cap 35. The smaller end of the plug 40 includes a stem portion 50 which projects through a retainer 51 mounted similarly to the cap 35 on the body 20, and the outer end of the stem 50 is provided with flats 52 on each side thereof for interlocking engagement with an operating handle in the usual way. The retainer 51 supports a sealing ring 53, gland 54 and gland follower 55, and the gland follower 55 includes a shoulder 56 adapted for engagement by the flats 52 on the stem 50 to limit turning movement of the plug 40 to 90° and thereby to define the open and closed positions of the valve. The retainer 51 also cooperates with a gasket 57 to seal the upper end of the body 20.

FIG. 2 illustrates the plug 40 in a partially closed position wherein it throttles the flow through the valve. In this position, it will be noted that the flow area from the inlet ports 22 and 32 into the plug port 41 is substantially equal to the flow area from the plug port 41 to the outlet ports 23 and 33. Since the full line pressure is effective in the inlet port 22, the major pressure drop effected by the throttling action of the plug will take place at the inlet end 42 of the plug port 41, and the line pressure will therefore seek to by-pass this restriction. The result of this condition, especially in valves of large size, is that the line pressure will force its way between the bore 21 and the edge portion of the liner sleeve overlying the inlet end 42 of the plug port, causing the liner material to bulge inwardly of the plug port as indicated in dotted lines in FIG. 2. Then when the plug is moved to its fully closed position, the distorted liner material tends to be caught inside the plug port and partially or wholly torn away.

The present invention provides a sleeve lined valve construction which eliminates the undesired condition and result just described, and FIGS. 3–9 illustrate different forms of the invention for accomplishing this result. Thus in FIG. 3, the body 20 and sleeve 30 are shown fragmentarily as identical with the similar parts in FIGS. 1 and 2. The plug 60 is generally of similar construction to the plug 40 and similarly includes a port 61 having an inlet end 62 and outlet end 63 located between the rib portions 65 and 66 of the plug. Instead of being of equal flow area at both ends, however, the plug port 61 has its inlet end 62 enlarged at 67 adjacent the rib 66 so that the rib 65 is of greater angular extent and sealing area than the rib 66. Except for this asymmetrical arrangement of the ribs 65 and 66, the valve of FIG. 3 may be identical with the valve of FIGS. 1 and 2, with means such as the shoulder 56 being provided to limit rotational movement of the plug from its fully opened position to a total of approximately 90° in clockwise direction as viewed in FIG. 3.

Figure 3:
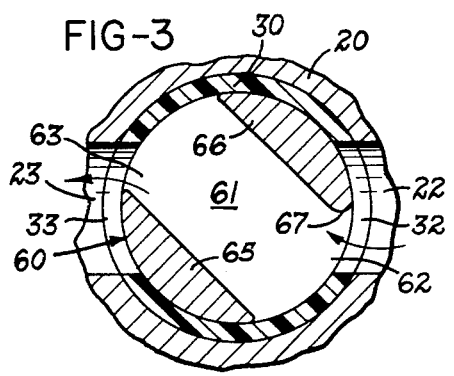
FIG. 3 is a fragmentary view similar to FIG. 2 illustrating a sleeve lined valve incorporating a plug constructed in accordance with the invention to prevent the distortion of the liner sleeve shown in FIG. 2.

FIG. 3 shows the plug 60 in a throttling position similar to that of the plug 40 in FIG. 2. However, with the rib 66 smaller than the rib 65, the flow area from the inlet ports 22 and 32 into the plug port 61 is substantially greater than the flow area from the plug port to the outlet ports 23 and 33. The major pressure drop therefore occurs at the outlet end 63 of the plug port, while the interior of the plug port and its flow connection with the inlet ports 22 and 32 remain at substantially the full line pressure. This condition provides for equal or greater pressure inside the sleeve 30 than outside, thus maintaining the normal position of the sleeve and so preventing damage thereto as the plug is turned toward the "off" position. The sleeve 30 therefore remains in proper position engaging the surface of the bore 21 and is protected against being caught and damaged inside the plug port during subsequent rotational movement of the port.

While FIG. 3 shows only one throttling position of the plug 60, it will be apparent that with the illustrated construction and arrangement of the plug with respect to the sleeve 30 and body, and particularly the relationship of the outer sealing surfaces of the plug ribs 65 and 66, the throttling action of the plug always takes place on the downstream side of the plug port 61. Thus during the entire rotational movement of the plug from its fully open position to a position of complete closure of the outlet ports 23 and 33 by the rib 65, the interior of the plug port 61 will be maintained in direct fluid receiving relation with the inlet ports 22 and 32 so that the pressure within the plug port will be maintained substantially matching the line pressure until the plug is completely closed. Under these conditions, the pressure within the plug port supports the liner material against deformation into the plug port and thereby protects it against the deformation and tearing which can otherwise occur as described in connection with FIG. 2.

Figure 4:
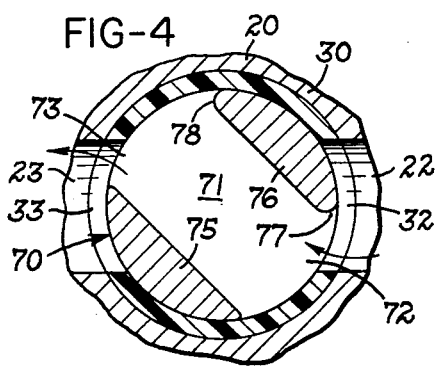
FIG. 4 is a view similar to FIG. 3 showing another plug construction in accordance with the invention which makes possible selective flow in either direction through the body while providing the advantages of the invention.

FIG. 4 shows a valve construction differing from that of FIG. 3 only in that the plug 70 is so constructed that either of the body ports 22 and 23 may serve selectively as the inlet port. Thus the plug port 71 is shown as having end portions 72 and 73 between the ribs 75 and 76, and the rib 75 is of the same proportions as the rib 65 in FIG. 3. The rib 76, however, is of symmetrically reduced angular extent with respect to the rib 75 to effect corresponding enlargement at 77 and 78 of both end of the plug port 71.

FIG. 4 shows the body port 22 as the inlet port in the same manner as in FIGS. 2 and 3, so that the retainer 55 should be positioned to limit rotational movement of the plug from its open position to 90° in clockwise direction. Under these conditions, the operation of the plug is the same as described in connection with FIG. 3, and the enlargement of the outlet end 73 of the plug port 71 has no effect. If it should be desired to reverse the direction of flow through the valve, it would be necessary only to reverse the retainer 55 to a position providing for closing movement of the plug in counterclockwise direction. The rib portion 75 of the plug would then close the ports 22 and 32 while the ports 23 and 33 remain in open communciation with the plug port 71 by way of the enlargement at 78 to maintain substantially constant pressure conditions upstream of the end portion 72 of the plug port.

Figure 5:
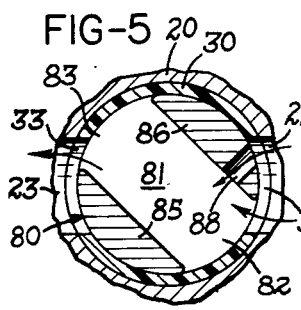
FIG. 5 is a view similar to FIG. 3 on a smaller scale showing another plug construction in accordance with the invention which provides the same advantages as the plug of FIG. 3.

FIG. 5 shows a valve construction similar in its operating characteristics to the construction described in connection with FIG. 3. The plug 80 includes a through port 81 having end portions 82 and 83 between the ribs 85 and 86, and the ribs 85 and 86 are of identical overall outline in section. However, the rib 86 is provided with a relief port 88 extending therethrough from the port 81 and located as shown to one side of a diameter normal to the axis of the port 81. The operation of this relief port 88 is similar to that of the enlargement of the plug port 71 at 67, since when the plug is in a throttling position as shown in FIG. 5, the port 88 effectively increases the flow area of direct communication between the interior of the plug port 81 and the inlet ports 22 and 32 of the valve body. The off-center location of the port 88 facilitates establishment of the desired differential pressure conditions throughout the valve, since it is positioned to begin to open to the inlet ports 22 and 32 before the outlet ports 23 and 33 have been more than half closed by the rib 85 of the plug.

Figure 6:
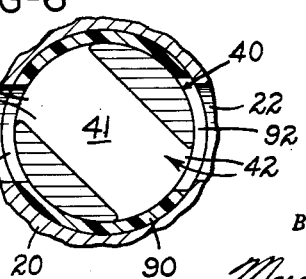
FIG. 6 is a view similar to FIG. 5 showing a configuration of the liner sleeve in accordance with the invention.

The valve construction shown in FIG. 6 is also similar in its operating characteristics to the contsruction described in connection wtih FIG. 3. The plug 40 is shown as identical with the plug 40 in FIGS. 1 and 2, with its through port 41 adapted for connection with the inlet and outlet ports 22 and 23 in the body 20. The liner sleeve 90, however, has an inlet port 92 which is of greater flow area than the body inlet port 22 and the plug port 41, while the outlet port 93 of the liner sleeve is of the same size and shape as the outlet port 23 of the body. With this construction, in the throttling position of the plug 40 shown in FIG. 6, the plug port 41 closes at its outlet end 43 while its inlet end 42 is still connected with the inlet port 22 by way of the enlarged port 92 in the sleeve 90 to establish the desired differential pressure conditions already described in connection with FIGS. 3–5.

FIGS. 7–10 show a further construction of sleeved valve in which the advantages of the invention as described above are achieved while maintaining equal flow capacity through all the ports. The valve body 100 has a conical bore 101 extending transversely therethrough. The inlet port 102 and outlet port 103 intersect the bore 101 from opposite sides, and the valve body is provided at the outer ends of these ports with circular flanges 105 of the usual type. The opposite ends of the bore 101 are provided with double counterbored portions forming a pair of shoulders 106–107 and 108–109 as shown in FIGS. 7 and 9, and the material of the liner sleeve 110 overlaps the inner ones of these shoulders 106 and 108.

As best seen by comparison of FIGS. 7 and 9, both of the ports 102 and 103 are contoured from a circular outline at their outer ends to an elongated outline at their inner ends. In addition, the inlet port 102 is substantially shorter in the direction of the axis of the bore 101 as well as wider in the transverse direction than the outlet port 103. For preferred operation, the ports 102 and 103 are of equal areas, and the sleeve 110 is provided with correspondingly contoured inlet and outlet ports 112 and 113. The valve body 100 is also provided with a bottom end cap 115 similar to the end cap 35 and similarly including a boss portion 116 clamping the liner material against the shoulder 106 through a sealing diaphragm 117. In addition, the body 100 and sleeve 110 are shown as having complementary ribs 118 and 119 extending lengthwise of their engaging surfaces to aid in holding the sleeve against rotational movement in the valve body.

The valve plug 120 in FIGS. 7–9 includes a through port 121 which is internally contoured to provide an inlet end 122 matching the sleeve port 112 and an outlet end 123 matching the sleeve port 113. The rib portions 125 and 126 of the plug, therefore, are of equal cross sectional area, but in the central sectional view as shown in FIG. 8, their inner surfaces converge in the direction of flow through the valve, and the port 121 has a correspondingly tapered shape. With this arrangement, it will be seen that a substantially smaller angular movement of the plug is required for the rib 125 to close the port 113 than for the rib 126 to close the port 112. Therefore, when the plug is in a throttling position as shown in FIG. 8, the major pressure drop occurs at the outlet end 123 of the plug port 121, while the interior of the plug port is maintained at substantially the same pressure as the inlet port 102 of the body.

FIGS. 7 and 10 also illustrate a different mechanical arrangement for limiting rotational movement of the plug 120 to the proper directions and angular extent. The stem portion 130 of the plug, the retainer 131 and the flats 132 on the stem 130 correspond to the similar parts in FIG. 1. The same is true of the sealing ring 133 and gland 134, and the retainer 131 similarly seals the body with the aid of a gasket 136. The gland follower 135, however, does not incorporate a stop like the shoulder 56 on the gland follower 55, but instead the heads of its mounting screws 137 serve as limiting stops for rotational movement of a wrench 140 as best seen in FIG. 10, the wrench having depending lugs 141 proportioned to abut the heads of the screws and thereby to provide for rotational movement of the wrench with the plug through only approximately 90°. Similar limiting or guiding means such as that described in connection with FIG. 1 could also be used to achieve the advantages of the invention with this valve construction.

FIGS. 11–14 show a valve generally similar to that described in connection with FIGS. 7–10 but differing therefrom primarily in the fact that the body 150 is closed at one end of the conical bore 151 by an integral portion of the cast body. The port arrangement in the body 150 is similar to that in the body 100, including an inlet port 152 and outlet port 153 which intersect the bore 151 from opposite sides, and the valve body 150 includes connecting flanges 155 of the usual type. The upper end of the bore 151 is provided with a counterbored portion forming an annular shoulder 156.

With the bore 151 closed at one end as described, the bore 151 tapers to diverge away from its closed end, and the liner sleeve 160 is similarly tapered. The body ports 152 and 153 are contoured in a similar manner to that described in connection with the ports 102 and 103 in FIGS. 7–9, and the sleeve 160 is provided with similarly contoured inlet and outlet ports 162 and 163. In addition, the body 150 and sleeve 160 are shown as having complementary ribs 164 and 165 extending lengthwise of the bore 151 to hold the sleeve 160 against rotational movement in the body.

The valve plug 170 in FIGS. 11–14 is tapered in the opposite direction from the plug 120, but it is otherwise similar in having its through port 171 internally contoured to provide an inlet end 172 matching the sleeve port 162 and an outlet end 173 matching the sleeve port 163, and the port 171 accordingly has a tapered shape in the cross sectional view of FIG. 12. The operation of this form of plug valve is accordingly essentially the same as that described in connection with the valve of FIGS. 7–10, as is illustrated in FIG. 12.

FIGS. 13 and 14 illustrate a further mechanical arrangement for effecting the desired limited rotational movement of the plug 170. The stem portion 180 of the plug, the retainer 181 and the flats 182 on the stem 180 correspond to the similar parts in FIGS. 7 and 8. The retainer 181 seals the valve body with the aid of a gasket 183 and also an annular thrust diaphragm 184, and the gland follower 185 cooperates with this diaphragm 184 and a thrust sleeve 186 to maintain sealing pressure of the plug 170 and sleeve 160, the gland follower 185 being adjustably mounted on the retainer 181 by screws 187. The desired controlled movements of the plug are effected by a gear segment 190 mounted on the flatted end of the stem 180 and cooperating with a drive pinion 191 and hand wheel 192 on a shaft 193 carried by a bracket 195 mounted on the retainer 181. The segment 190 need be only approximately 90° in angular extent, and a stop portion 196 of the bracket 195 will engage opposite side rib portions 197 of the segment 190 to prevent its rotation beyond the proper open and closed limit positions of the plug.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A plug valve comprising a valve body having a bore extending transversely thereof, means defining an inlet port and an outlet port in said body intersecting said bore, liner means received in sealing relation with said bore, said liner means having ports therethrough matching said ports in said body and presenting edge portions overlying said body ports and opposing line pressure in said inlet port, a valve plug received in rotatable sealing relation with said liner means, means defining a port through said plug having inlet and outlet ends adapted respectively to register with said inlet and outlet ports in said liner means and said body to define the open position of said plug, means establishing a limited range of rotational movement of said plug in one direction from said open position to the closed position thereof wherein said plug port is out of registry with said body ports, and said plug and said liner means and body being so constructed and arranged that during said rotational movement of said plug from said open position to said closed position said outlet port of said body closes entirely while the interior of said plug port continues in direct fluid receiving relation with said inlet port of said body.

2. A plug valve comprising a valve body having a bore extending transversely thereof, means defining an inlet port and an outlet port in said body intersecting said bore, liner means received in sealing relation with said bore, said liner means having ports therethrough matching said ports in said body and presenting edge portions overlying said body ports and opposing line pressure in said inlet port, a valve plug received in rotatable sealing relation with said liner means, means defining a port through said plug having inlet and outlet ends adapted respectively to register with said inlet and outlet ports in said liner and body to define the open position of said plug, means establishing a limited range of rotational movement of said plug in one direction from said open position to the closed position thereof wherein said plug port is out of registry with said body ports, and said plug including means maintaining direct communication between said plug port and said inlet port of said body throughout the entire range of rotational movement of said plug from said open position to a position of complete closure of said outlet port.

3. A plug valve comprising a valve body having a bore extending transversely thereof, means defining an inlet port and an outlet port in said body intersecting said bore, a tubular liner received in sealing relation with said bore, said liner means having ports therethrough matching said ports in said body and presenting edge portions overlying said body ports and opposing line pressure in said inlet port, a valve plug received in rotatable sealing relation with said liner, means defining a port through said plug having inlet and outlet ends adapted respectively to register with said inlet and outlet ports in said liner and body to define the open position of said plug, said plug including a first outer surface portion on one side of said port therein adapted to close said outlet port upon rotational movement of said plug in a predetermined direction from said open position thereof, and the outer surface portion of said plug on the opposite side thereof having the corresponding sealing area thereof located to maintain direct communication between said plug port and said inlet port throughout the entire range of movement of said plug from said open position to a position of complete closure of said outlet port by said first surface portion of said plug.

4. A plug valve comprising a valve body having a bore extending transversely thereof, means defining an inlet port and an outlet port in said body intersecting said bore, liner means received in sealing relation with said bore, said liner means having ports therethrough matching said ports in said body and presenting edge portions overlying said body ports and opposing line pressure in said inlet port, a valve plug received in rotatable sealing relation with said liner means, means defining a port through said plug having inlet and outlet ends adapted respectively to register with said inlet and outlet ports in said body to define the open position of said plug, means establishing a limited range of rotational movement of said plug in one direction from said open position to a closed position wherein the outer surface portion of said plug on one side of said plug port closes said outlet port, and said plug surface portion being so located and proportioned that during said rotational movement of said plug from said open position to said closed position the interior of said plug port continues in direct fluid receiving relation with said inlet port of said body.

5. A plug valve comprising a valve body having a bore extending transversely thereof, means defining an inlet port and an outlet port in said body intersecting said bore from opposite sides thereof, liner means received in sealing relation with said bore, said liner means having ports therethrough matching said ports in said body and presenting edge portions overlying said body ports and opposing line pressure in said inlet port, a valve plug received in rotatable sealing relation with said liner means, means defining a port through said plug having inlet and outlet ends adapted respectively to register with said inlet and outlet ports in said body to define the open position of said plug, means establishing a limited range of rotational movement of said plug in one direction from said open position to a closed position wherein the outer surface portion of said plug on one side of said plug port closes said outlet port in said liner means, and said plug including means maintaining direct communication between said plug port and said inlet port throughout said rotational movement of said plug from said open position to said closed position.

6. A plug valve comprising a valve body having a bore extending transversely thereof, means defining an inlet port and an outlet port in said body intersecting said bore, liner means received in sealing relation with said bore, said liner means having ports therethrough matching said ports in said body and presenting edge portions overlying said body ports and opposing line pressure in said inlet port, a valve plug received in rotatable sealing relation with said liner means, said plug having a port extending therethrough for registry with said inlet and outlet ports in said liner means and said body to define the open position of said plug, said plug including rib portions on either side of said port therethrough having outer surfaces contoured for sealing engagement with said liner means, means establishing a limited range of rotational movement of said plug in one direction from said open position to a closed position thereof wherein one of said plug rib portions closes said outlet port in said body, and said plug and said body being so constructed and arranged that throughout at least the last half of said rotational movement of said plug from said open position to said closed position the flow area through said inlet ports to said plug port is substantially greater than the flow area from said plug port to said outlet ports.

7. A plug valve as defined in claim 6 wherein said one rib portion is of smaller dimensions measured circumferentially of said plug at the center line of said plug port than the other of said rib portions.

8. A plug valve as defined in claim 6 comprising means defining a relief port extending through said one rib portion in closely spaced relation with the end of said plug port which registers with said inlet port of said body in said open position of said plug.

9. A plug valve as defined in claim 1 wherein said inlet port in said liner means is of greater dimensions measured radially of said plug than said inlet end of said plug port.

10. A plug valve comprising a valve body having a bore extending transversely thereof, means defining an inlet port and an outlet port in said body intersecting said bore, liner means received in sealing relation with said bore and having ports therethrough matching said ports in said body, a valve plug received in rotatable sealing relation with said liner means, means defining a port through said plug having inlet and outlet ends adapted respectively to register with said inlet and outlet ports in said liner and body to define the open position of said plug, means establishing a limited range of rotational movement of said plug from said open position to the closed position thereof wherein said plug port is out of registry with said body ports, and said inlet end of said plug port being of greater dimensions measured circumferentially of said plug than said outlet end of said plug port to maintain direct communication between said plug port and said inlet port of said body throughout the entire range of rotational movement of said plug from said open position to a position of complete closure of said outlet port.

11. A plug valve comprising a valve body having a bore extending transversely thereof, means defining an inlet port and an outlet port in said body intersecting said bore, said inlet port being of substantially greater dimensions measured circumferentially of said bore than said outlet port, liner means received in sealing relation with said bore and having ports therethrough matching said ports in said body, a valve plug received in rotatable sealing relation with said liner means, means defining a port through said plug having inlet and outlet ends adapted respectively to register with said inlet and outlet ports in said liner and body to define the open position of said plug, means establishing a limited range of rotational movement of said plug from said open position to the closed position thereof wherein said plug port is out of registry with said body ports, and said inlet and outlet ends of said plug port being of substantially the same dimensions measured circumferentially of said plug as the respective said body ports to maintain direct communication between said plug port and said inlet port of said body throughout the entire range of rotational movement of said plug from said open position to a position of complete closure of said outlet port.

12. A plug valve comprising a valve body having a bore extending transversely thereof, means defining an inlet port and an outlet port in said body intersecting said bore, and of substantially the same flow areas, said inlet port being of substantially greater dimensions measured circumferentially of said bore than said outlet port, liner means received in sealing relation with said bore and having ports therethrough matching said ports in said body, a valve plug received in rotatable sealing relation with said liner means, means defining a port through said plug having inlet and outlet ends adapted respectively to register with said inlet and outlet ports in said liner and body to define the open position of said plug, means establishing a limited range of rotational movement of said plug from said open position to the closed position thereof wherein said plug port is out of registry with said body ports, and said inlet and outlet ends of said plug port being of substantially the same dimensions measured circumferentially of said plug as the respective said body ports to maintain direct communication between said plug port and said inlet port of said body throughout the entire range of rotational movement of said plug from said open position to a position of complete closure of said outlet port.

13. A plug valve including a liner for controlling fluid pressure in a flow line in which line pressure is maintained on the inner surface of the liner until after the flow has been stopped to retain said liner in sealing relation within the valve, comprising a valve body having a bore and inlet and outlet ports intersecting said bore, a liner in said bore having inlet and outlet ports therethrough in communication with said respective ports of said body, a valve plug rotatably received within said liner in sealing relation therewith and having a flow passage therethrough communicating between said inlet and outlet ports of said liner, said flow passage being shaped in cooperation with the arrangement of said liner and its ports providing for reducing the flow area between said flow passage and said liner outlet port as the plug is rotated toward closed position at a more rapid rate than the reduction of the flow area between said flow passage and said liner inlet port to provide for throttling of the flow at said outlet end while maintaining the pressure upon the inner surface of said liner until the flow has been stopped.

14. A plug valve including a liner for controlling fluid pressure in a flow line in which line pressure is maintained on the inner surface of the liner until after the flow has been stopped to retain said liner in sealing relation within the valve comprising a valve body having a bore and inlet and outlet ports intersecting said bore, a liner in said bore having inlet and outlet ports therethrough in communication with said respective ports of said body, a valve plug rotatably received within said liner and having a flow passage therethrough with an inlet and an outlet adapted to register with said inlet and outlet ports respectively in the open position and to close against said liner in the closed position of said valve, said plug being shaped asymmetrically such that the flow area between the outlet of said flow passage and the outlet port of said liner becomes progressively less than the flow area between the inlet of said flow passage and said inlet port of said liner as the valve is moved toward closed position whereby line pressure is maintained effective on the inner face of said liner to retain said liner in pressure sealed relation against said valve body over substantially its entire extent until after the flow through said valve has been cut off.

15. A plug valve comprising a valve body having a bore extending transversely thereof, means defining an inlet port and an outlet port in said body intersecting said bore, liner means in said valve body in sealing relation with said bore, said liner means having inlet and outlet ports therethrough in communication with said ports in said body, a valve plug rotatably received within said liner means in sealing relation therewith, rib means defining a port through said plug having inlet and outlet ends adapted to register with said ports in said liner and with said inlet and outlet ports in said valve body respectively in the open position of said valve, said rib means having an asymmetrical arrangement such that on rotational movement of said plug to close said valve its outlet port closes with respect to said outlet port of said liner means in advance of the closing of its said inlet port with respect to said inlet port of said liner means.

References Cited in the file of this patent

UNITED STATES PATENTS

| Number | Name | Date |
|---|---|---|
| 512,892 | Munger | Jan. 16, 1894 |
| 1,400,647 | Westinghouse | Dec. 20, 1921 |
| 2,011,063 | Masoner | Aug. 13, 1935 |
| 2,018,034 | Roberts | Oct. 22, 1935 |
| 2,547,116 | Gould | Apr. 3, 1951 |
| 2,913,219 | Freed | Nov. 17, 1959 |

FOREIGN PATENTS

| Number | Country | Date |
|---|---|---|
| 532,235 | Canada | Oct. 23, 1956 |